Oct. 12, 1937.  Z. TAKATS  2,095,536
MOTION PICTURE PROJECTOR
Filed March 2, 1935  4 Sheets-Sheet 1

INVENTOR.
Zoltan Takats
BY
ATTORNEY.

Oct. 12, 1937.   Z. TAKATS   2,095,536
MOTION PICTURE PROJECTOR
Filed March 2, 1935   4 Sheets-Sheet 2
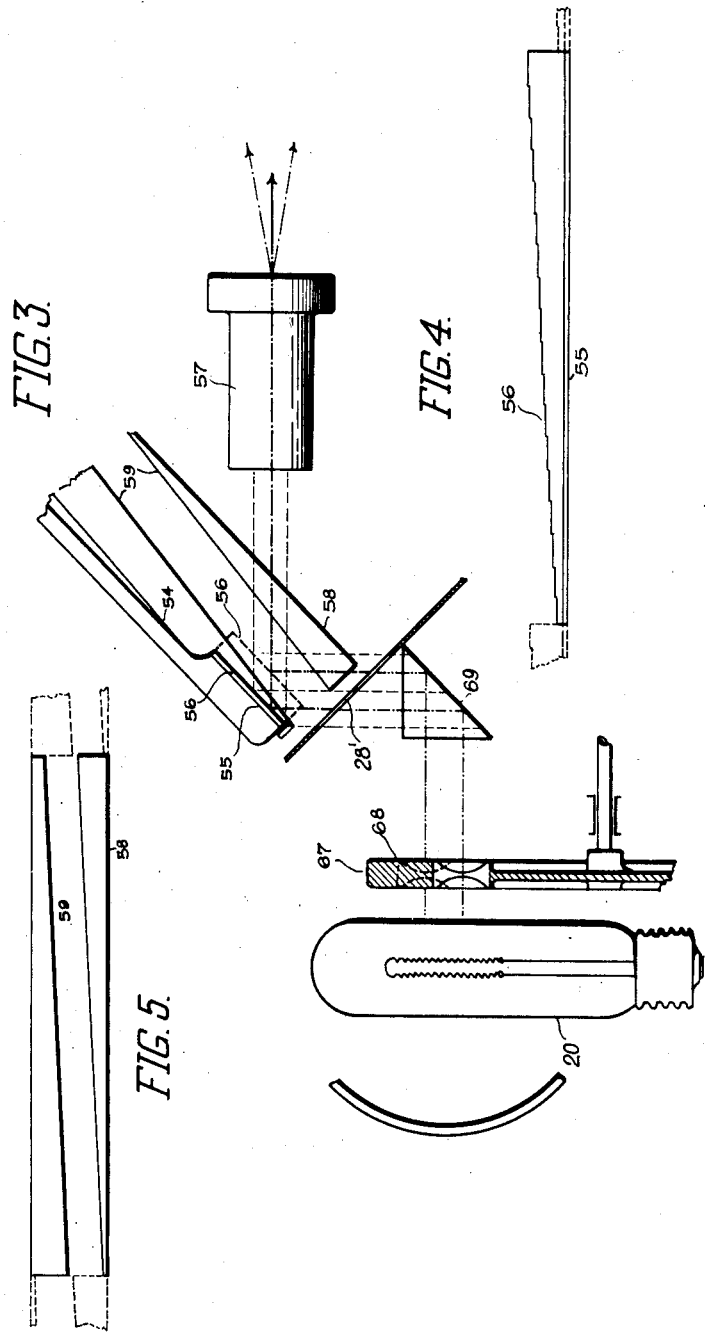
INVENTOR.
Zoltan Takats
BY
ATTORNEY.

Oct. 12, 1937.                    Z. TAKATS                    2,095,536
                          MOTION PICTURE PROJECTOR
                            Filed March 2, 1935              4 Sheets-Sheet 3
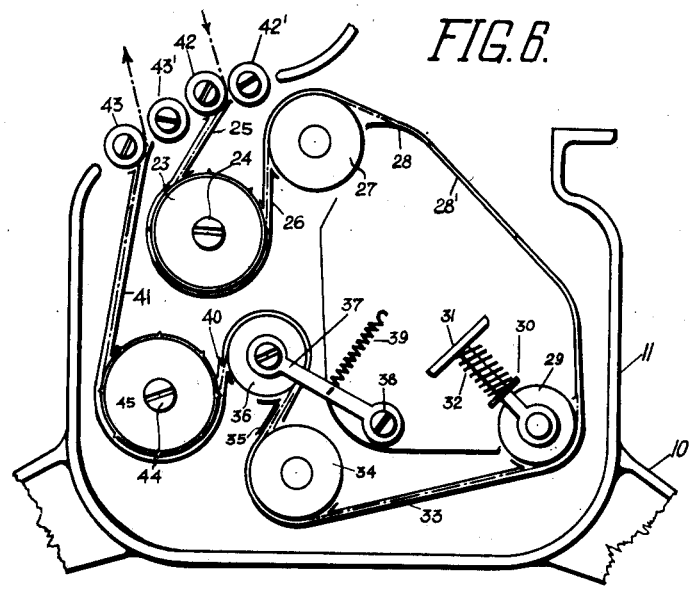
FIG. 6.
FIG. 8.
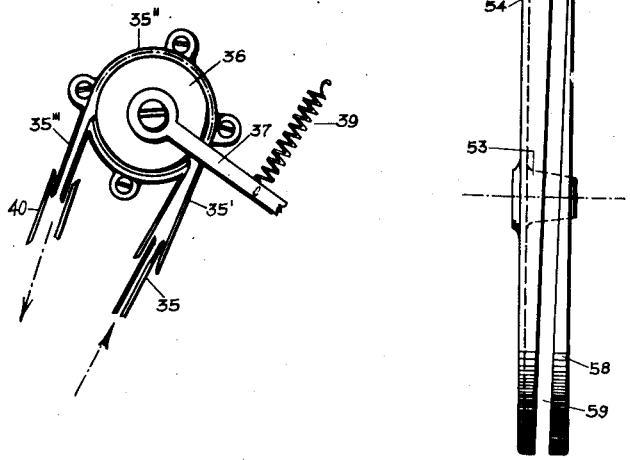
FIG. 7.
INVENTOR.
Zoltan Takats
BY
ATTORNEY.

Oct. 12, 1937.  Z. TAKATS  2,095,536
MOTION PICTURE PROJECTOR
Filed March 2, 1935   4 Sheets-Sheet 4

INVENTOR.
Zoltan Takats
BY
ATTORNEY.

Patented Oct. 12, 1937

2,095,536

UNITED STATES PATENT OFFICE 2,095,536

MOTION PICTURE PROJECTOR

Zoltan Takats, West Englewood, N. J.

Application March 2, 1935, Serial No. 9,018

5 Claims. (Cl. 88—16.8)

The present invention relates to improvements in motion picture projectors, with or without sound, one object of the invention being the provision of projector in which the film is moved at a constant speed, and the movement of the picture across the aperture is compensated for so that there is a constant or persistency of vision, and as the film is thus moved, there is no need for the elaborate mechanism of the sound head as is usually necessary with intermittent action projectors.

Another object of this invention is the provision of a projector of this type, which is simple, durable and practical in construction, and which is readily threaded and put into use.

In the accompanying drawings:—

Figure 3 is a diagrammatic view of the complete optical arrangement of the present projector.

Figure 4 is a side view of the reflector member showing the relative position of the mirrors placed in a straight line.

Figure 5 is a plan diagrammatic view of the means for advancing the film in synchrony with the mirrors of the optical system.

Figure 6 is a section taken through the housing of the projector showing the film advancing and threading means.

Figure 7 is a plan view of the mirror carrier and film advancing means.

Figure 8 is an enlarged detail view of a portion of the film feeding chutes and one tension sprocket or roller.

Figure 1:
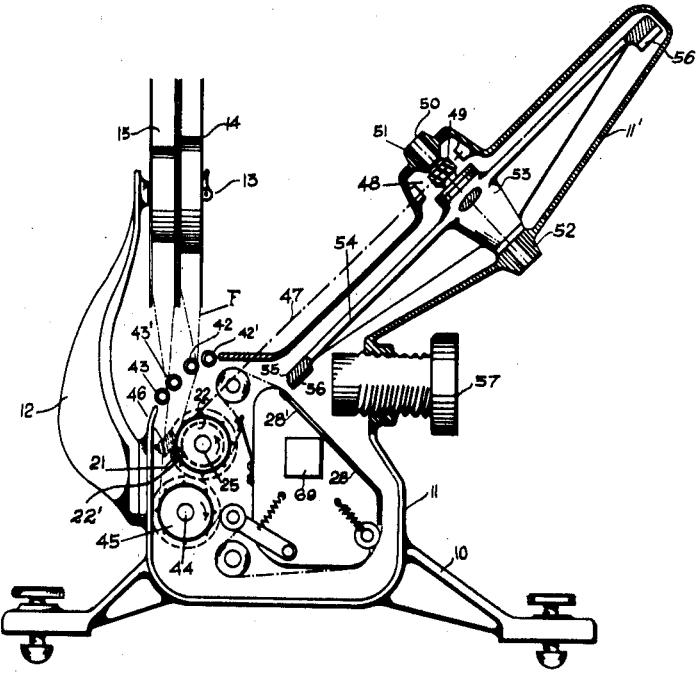
Figure 1 is a view partly in elevation and in section of the complete projector made according to and embodying this invention.
Figure 2:
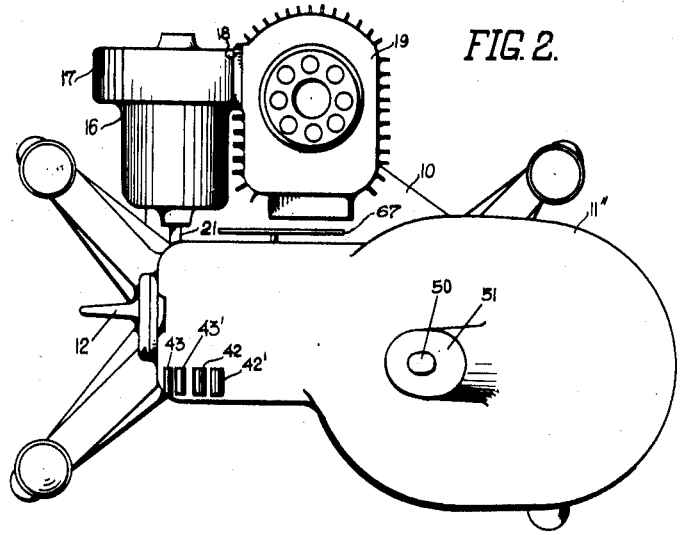
Figure 2 is a top plan view of the projector with the film reels and their supporting axle removed.
Figure 10:
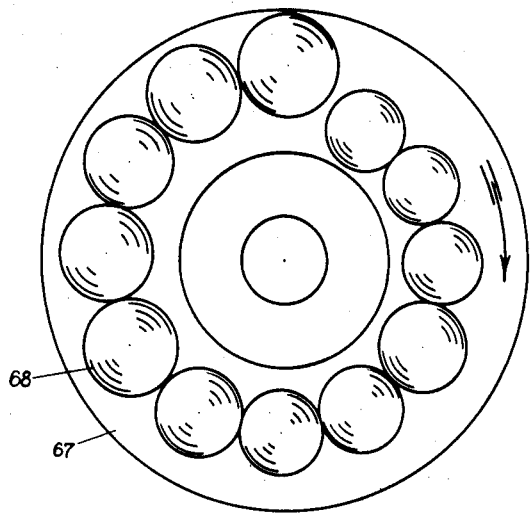
Figure 10 is a plan view of a modified form of condenser lens arrangement usable with this invention.

Referring to the drawings, the numeral 10 designates the base carrying the main housing 11 of the projector. A bracket 12 supports the axle 13 to receive the feed reel 14 and the receiving reel 15, so that the film F will assume dotted line position in Fig. 1, and the dot-and-dash lines in Fig. 6.

An electric motor 16 is the prime mover, and is provided with a fan casing 17, carrying a fan (not shown) which blows a cooling blast into the lamp house 19 and the inlet 18, and removably mounted in the lamp house is an incandescent filament lamp 20, although where desired an arc lamp may be used.

The motor shaft 21 enters the main housing and through the gearing 22 and 22', drives the upper film sprocket 23 mounted on its stud 24, while also driven from the shaft 21, as will later appear is the condenser lens disk, which presents its lens in proper timed relation, to direct the light beams from the lamp 20, but as shown in diagram in Fig. 3.

Led from the two guide rollers 42—42', is a film chute section 25, which directs the film to and around the sprocket 23, and through the chute section 26, over the roller 27, and on the film guide 28, provided with the aperture 28', through which light is projected onto and through the portion of the film adjacent to and moving past said aperture. The surface of this guide 28 is at a 45° angle, the purpose of which will presently appear. The film now passes over the roller 29, carried bodily and movably with the stem 30, which is mounted for sliding movement in the member 31, so that the spring 32 will exert a tension to hold the film taut as it moves through the chute section 33 around the roller 34. The film now moves through the short chute section 35, which as shown in Fig. 8, telescopes with the short guide 35', around the roller 36 in the housing 35'', and out of the short guide 35''', into the upper end of the chute section 40. The roller 36 is carried by the arm 37, pivoted at 38 for swinging movement, so that the spring 39 will exert a tension to pull upon the film as against the roller 34 and the lower sprocket 45 mounted on its shaft 44. The film now passes around the sprocket 45 through the long chute section 41, through the pair of guide rollers 43—43', onto the wind-up reel. By this arrangement there is provided a self-feeding means for the film, as it after one end is inserted between the roller 42—42', will be guided, either by moving the sprockets 24 and 45, to emerge between the guide rollers 43—43', where the end can be threaded upon the receiving reel. The constant speed at which the film is to be driven, and due to the fact that no "loops", as in intermittent projectors, are necessary, permits such self feeding, which is a very desirable feature in a machine of this type.

A gear 46 is driven from the shaft 21 to in turn drive the long shaft 47, and through the gears 48 and 49 the shaft 50. The shaft 50 is journaled in the bearings 51 and 52 of the extension 11' of the main housing, and carried on this shaft with the extension is the hub 53 of the wheel 54, upon the lower face of the periphery 55 of which is carried a plurality of reflectors or mirrors 56, disposed in stepped arrangement as shown in Fig. 4, and to compensate for the movement of the picture frame across the aperture 28', and to present the picture properly at all times to the projecting lens 57. In order that the upper and lower edges of the moving film may be properly framed, the member 58 having the inclined portion 59, is mounted to rotate with the wheel 54.

Figure 9:
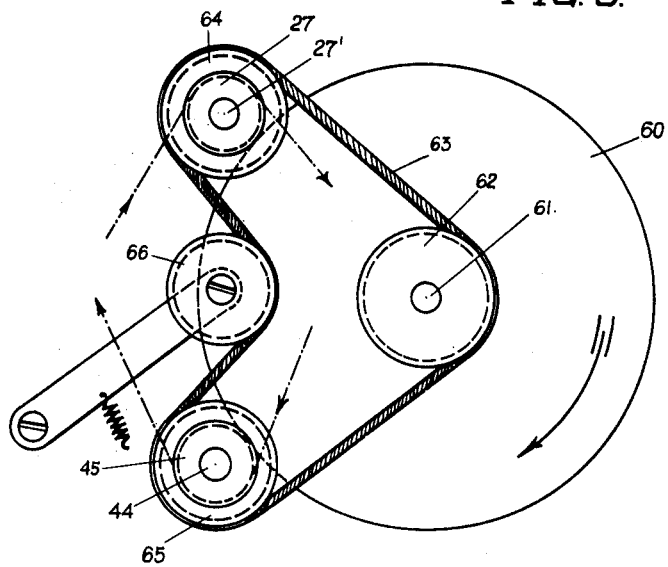
Figure 9 is a view illustrating how a fly wheel can be connected.

That desirable steady motion may be imparted to the mechanism, a fly wheel 60 is mounted upon a shaft 61 carried by the main housing, so that the pulley 62, through the belt 63, is rotated from the pulleys 64 and 65, carried by the shafts 27' and 44, respectively. A spring pressed roller or pulley 66 maintains the belt at the proper tautness (Fig. 9).

In Figure 3, the disk 67 carries the condenser lenses 68 disposed in spiral formation and when interposed between the lamp 20 and a reflector or prism 69 in the main housing directs the rays or beam of light on the film F at the aperture 28'. This disk being driven from the motor shaft 21, moves in synchrony with the mirror wheel 54.

When the film is properly threaded and the machine is being operated, the film will pass over the guide 28 and past the aperture 28', in the direction of the arrow, Fig. 3, so that the beams of light from the lamp 20 will be directed through condenser lens 68 in the direction of the arrows, and on to and through the moving picture frame of the film F. The several positions as illustrated by dash and dot-and-dash lines will be followed, with all of the intermediate positions, so that the image of the picture striking the successive mirrors 56, will be directed in the same line at all times to the projector lens system.

It will thus be seen that with a construction as here shown and described, that the single picture frame passing across the aperture 28', will have its framing movement compensated for, so that a steady picture will be finally projected upon the screen.

The grooved ring 58 rotated with the mirror wheel 54 has the same pitch as the advancing film and gradually shifts the film to frame the same, and at the end of the cycle abruptly completes the framing and starts the next incoming picture frame.

The mirrors 55 have their successive stepped formation so relatively small, that no appreciable change takes place to disturb the optical relation between the picture and the objective lens, that is the actual distance between the moving central point of the film and the objective lens— the back focus so called— is practically constant, so that the picture is stationary and is at all times in focus.

Inasmuch as the film is constantly moving with a uniform speed, the film is stretched and slides on a predetermined way—no loops being required—, giving an excellent chance to thread the machine automatically, as previously described.

To thread the machine automatically, the tension roller with its telescopic guides is pushed down, the machine is then started, and the film inserted, so that the feed sprocket through its teeth picks up the film, feeds it into the directing chutes and finally to the take-up sprocket, where it is pushed out to be attached to the feed on reel. By releasing the first roller, the film in the projector is made taut, and the machine is operated to project the pictures.

Although no sound head has been shown in connection with this machine, it is apparent that some place within the guide 78, a sound track aperture can be formed, with an exciter lamp disposed to project a beam of light through the sound track of the film, onto a photoelectric cell within the main housing and near the member 31.

The mirrors are lined up exceedingly accurately and the greater the number thereof the better, for good definition, and they should be in sufficient number and of such accuracy as not to permit any undue advancement or retardation of the uniformity in the moving of the film.

What is claimed is:—

1. A motion picture projector, including in combination a supporting structure, a main housing with an enlarged extension, the extension being at an angle of 45 degrees to the base line of the structure, a film advancing mechanism mounted in the main housing, a film guide mounted in the main housing and having an aperture at an angle of 90° to the extension, a light source, means for directing a beam of light from the light source through said aperture, a rotating mirror carrying member mounted in the extension, the mirrors of which are flat disposed upon one face of its periphery and with their faces in parallel and stepped relation to each other through the circumference of the member, said mirrors being in the path to receive the light beam projected through the aperture, and a fixed projector lens system mounted in the main housing and disposed to receive the beam of light directed from the respective mirrors.

2. A reflecting element for a continuously moving film motion picture projector including a wheel, and a series of flat faced reflectors carried upon one side at the periphery thereof so that their faces are parallel to each other but at different planes.

3. A motion picture projector, including in combination a casing having an apertured film guide, means for progressing a motion picture film continuously past the aperture, a lamp, a prism for directing the beam from the source through the aperture and presented picture frame of the film, a rotary member carrying condenser lenses disposed between the source and the prism for directing the beam upon the prism in synchrony with the movement of the picture frame, a motor for actuating the said rotary member, a fixed lens system for projecting the picture frame image, a second rotary member also actuated by the motor in synchrony with the first member and the film, a plurality of flat faced and stepped reflectors carried by the second rotary member and disposed to receive the image projected by the prism through the film and aperture and directing such image without perceptible flutter, and a fixed lens system to receive the projected images.

4. A motion picture projector as claimed in claim 3, wherein the second rotary member is in the form of a wheel with its reflectors in the form of mirrors mounted at one side of its periphery, the faces of the mirrors being in parallel to each other but in different planes.

5. In a motion picture projector, a main housing with an enlarged extension, the extension being at an angle of 45 degrees to the base line of the main housing, a film guide mounted in the main housing and having an aperture at an angle of 90 degrees to the extension, a rotating mirror carrying member mounted in the extension, the mirrors of which are flat disposed upon one face of its periphery and with their faces in stepped relation to each other and parallel to each other and the axis of the extension, a light source, means for directing a beam of light from the light source through the said aperture to the rotating mirrors at the proper angle to permit the beam when reflected from said rotating mirrors to be received by the hereinafter mentioned projector lens system, and a fixed projector lens system mounted in the main housing with its axis parallel to the base line of said housing and disposed to receive the beam of light directed to it from the respective mirrors.

ZOLTAN TAKATS.